United States Patent [19]

Enomoto et al.

[11] Patent Number: 4,973,118
[45] Date of Patent: Nov. 27, 1990

[54] SECOND HARMONIC WAVE GENERATING DEVICE

[75] Inventors: Ryo Enomoto; Masaya Yamada, both of Gifu, Japan

[73] Assignee: Ibiden Co., Ltd., Ogaki, Japan

[21] Appl. No.: 452,410

[22] Filed: Dec. 19, 1989

[51] Int. Cl.$^5$ ................................................ G02F 1/37
[52] U.S. Cl. ................................ 350/96.12; 307/427; 307/430; 350/96.34
[58] Field of Search ............... 350/96.12, 96.15, 96.16, 350/96.29, 96.34; 307/425-430

[56] References Cited

U.S. PATENT DOCUMENTS

| | | | |
|---|---|---|---|
| 4,733,109 | 3/1988 | Palazzotto | 307/427 |
| 4,756,598 | 7/1988 | Gerbi et al. | 350/96.29 |
| 4,893,888 | 1/1990 | Okazaki et al. | 350/96.12 |
| 4,896,931 | 1/1990 | Khurgin | 350/96.12 |
| 4,896,933 | 1/1990 | Yano et al. | 350/96.15 |
| 4,909,598 | 3/1990 | Ninomiya et al. | 350/96.34 |
| 4,923,277 | 5/1990 | Okazaki et al. | 350/96.29 |

Primary Examiner—John D. Lee
Attorney, Agent, or Firm—Sherman and Shalloway

[57] ABSTRACT

A second harmonic wave generating device of a thin film waveguide structure having a high conversion efficiency, which satisfies the following equation:

$$\text{when } \frac{(n_{oF1} - n_{oS1})}{(n_{eF2} - n_{eS2})} > 2$$

$$0.02 \leq \frac{(\lambda + 0.1) N_1}{\lambda^3 T} \leq 6.0$$

$$\text{or, when } \frac{(n_{oF1} - n_{oS1})}{(n_{eF2} - n_{eS2})} \leq 2$$

$$0.05 \leq \frac{(\lambda + 0.1) N_2}{\lambda^3 T} \leq 5.0$$

wherein,
$\lambda \mu m$: fundamental wavelength
$T \mu m$: thickness of the thin film waveguide layer
$n_{oS1}$: ordinary refractive index of the substrate at the fundamental wavelength
$N_{oF1}$: ordinary refractive index of the thin film waveguide layer at the fundamental wavelength
$N_{eS2}$: extraordinary refractive index of the substrate at the second harmonic wavelength
$n_{eF2}$: extraordinary refractive index of the thin film waveguide layer at the second harmonic wavelength $$N_1 = \frac{(n_{eF2} - n_{eS2})}{(n_{oF1} - n_{eS2})}$$

$$N_2 = \frac{(n_{eF2} - n_{eS2})}{(n_{oF1} - n_{oS1})}$$

7 Claims, No Drawings

SECOND HARMONIC WAVE GENERATING DEVICE

BACKGROUND OF THE INVENTION

This invention relates to a second harmonic wave generating device (hereinafter referred to as "SHG device") of a thin film waveguide structure with a high conversion efficiency.

A SHG device utilizes nonlinear optical effects of a nonlinear optical material to convert wavelength λ of incident laser light to wavelength ½λ, which is outputted. Since the output light has a half wavelength of incident light, the device can be used in an optical disc memory and CD player to achieve a 4-times increase in recording density, and can be used in a laser printer and photolithography with enhanced resolution.

Heretofore, a bulk single crystal of a nonlinear optical material using a high-output-power gas laser as a light source has been used as SHG device. However, with recent increases in demand for compact optical disc systems and laser printers and since gas laser requires an external modulator for optical modulation and is not suited for compact design, a SHG device that enables use of a semiconductor laser, which can be directly modulated and is lower in cost and easier to handle than gas laser, has been in demand.

When a semiconductor laser is used as a light source, since the semiconductor laser has a low output power of several mW to several ten mW, a SHG device of a thin film waveguide structure which has a particularly high conversion efficiency has been required.

Generation of second harmonic optical wave using a thin film waveguide has advantages that: (1) energy of light concentrated on the thin film can be utilized, (2) since optical wave is confined within the thin film and does not diffuse, interaction is possible over a long distance, and (3) a substance, which cannot make phase matching in the bulk state, becomes able to make phase matching by utilizing mode dispersion of thin film (Miyama and Miyazaki; IEICE Technical Report, OQE75-6 (1975), Miyazaki, Hoshino, and Akao; Proceedings of Electromagnetic Field Theory Research Conference, EMT-78-5 (1978)).

However, in order to obtain a SHG device of a thin film waveguide structure, it has heretofore been necessary to conduct experiments with substrates of different materials and thin film waveguide layers of different materials and thicknesses at an objective fundamental wavelength to find conditions for generation of a second harmonic wave and to determine the structure, thus requiring very inefficient work.

The inventors have conducted intensive studies and have found that a second harmonic wave can be generated very efficiently by satisfying a specific relation of a fundamental wavelength (λμm), a thickness (Tμm) of the thin film waveguide layer, an ordinary refractive index (noS1) of the substrate at the fundamental wavelength (λμm), an ordinary refractive index (noF1) of the thin film waveguide layer at the fundamental wavelength (λμm), an extraordinary refractive index (neS2) of the substrate at a second harmonic wavelength (λμm/2), and an extraordinary refractive index (neF2) of the thin film waveguide layer at the second harmonic wavelength (λμm/2), thus accomplishing the present invention.

SUMMARY OF THE INVENTION

In accordance with the present invention, there is provided a SHG device characterized in that a fundamental wavelength (λμm), a thickness (Tμm) of a thin film waveguide layer, an ordinary refractive index (noS1) of the substrate at the fundamental wavelength (λμm), an ordinary refractive index (noF1) of the thin film waveguide layer at the fundamental wavelength (λμm), an extraordinary refractive index (neS2) of the substrate at a second harmonic wavelength (λμm/2), and an extraordinary refractive index (neF2) of the thin film waveguide layer at the second harmonic wavelength (λμ/2) are represented by an equation when $\frac{(n_{oF1} - n_{oS1})}{(n_{eF2} - n_{eS2})} > 2$ $$0.02 \leq \frac{(\lambda + 0.1) N_1}{\lambda^3 T} \leq 6.0 \quad \text{(A)}$$

or, when $\frac{(n_{oF1} - n_{oS1})}{(n_{eF2} - n_{eS2})} \leq 2$ $$0.05 \leq \frac{(\lambda + 0.1) N_2}{\lambda^3 T} \leq 5.0 \quad \text{(B)}$$

wherein, $N_1$ in Equation (A) above is $$N_1 = \frac{(n_{eF2} - n_{eS2})}{(n_{oF1} - n_{eS2})}$$

and $N_2$ in Equation (B) above is $$N_2 = \frac{(n_{eF2} - n_{eS2})}{(n_{oF1} - n_{oS1})}.$$

The inventive SHG device comprising a substrate and a thin film waveguide layer formed on the substrate, which has a structure that satisfies the above Equation (A) or (B) of the ordinary refractive indices to a fundamental wave and the extraordinary refractive indices to a second harmonic wave of the substrate and the thin film waveguide layer, and of the thickness of the thin film waveguide layer, can generate the second harmonic wave of a specific fundamental wavelength.

The inventive SHG device must have a thin film waveguide layer formed on a substrate.

This is not only because generation of the second harmonic wave in the SHG device which has the thin film waveguide layer formed on the substrate has the advantages that the energy of light concentrated on the thin film can be utilized and, since the optical wave is confined within the thin film and does not diffuse, interaction can be made over a long distance, but also because phase matching is possible by mode dispersion of the thin film, even using a substance which cannot make phase matching when used in a bulk single crystal in a prior art SHG device.

In the inventive SHG device, the fundamental wavelength (λμm), the thickness (Tμm) of the thin film waveguide layer, the ordinary refractive index (noS1) of the substrate at the fundamental wavelength (λμm), the ordinary refractive index (noF1) of the thin film waveguide layer at the fundamental wavelength (λμm), the extraordinary refractive index (neS2) of the substrate at the second harmonic wavelength ($\lambda\mu m/2$), and the extraordinary refractive index (neF2) of the thin film waveguide layer at the second harmonic wavelength ($\lambda\mu m/2$) are required to satisfy the equation when $\dfrac{(n_{oF1} - n_{oS1})}{(n_{eF2} - n_{eS2})} > 2$ $$0.02 \leq \dfrac{(\lambda + 0.1) N_1}{\lambda^3 T} \leq 6.0 \quad (A)$$

or, when $\dfrac{(n_{oF1} - n_{oS1})}{(n_{eF2} - n_{eS2})} \leq 2$ $$0.05 \leq \dfrac{(\lambda + 0.1) N_2}{\lambda^3 T} \leq 5.0 \quad (B)$$

wherein, $N_1$ in Equation (A) above is $$N_1 = \dfrac{(n_{eF2} - n_{eS2})}{(n_{oF1} - n_{eS2})}$$

and $N_2$ in Equation (B) above is $$N_2 = \dfrac{(n_{eF2} - n_{eS2})}{(n_{oF1} - n_{oS1})}.$$

This is because, in the SHG device comprising the thin film waveguide layer formed on the substrate, the conversion efficiency to the second harmonic wavelength is so low that cannot be used in practical use, unless the structure of the device satisfies either Equation (A) or Equation (B).

In particular, in order to obtain a high conversion efficiency to the second harmonic wavelength, it is preferable that the fundamental wavelength ($\lambda\mu m$), the thickness ($T\mu m$) of the thin film waveguide layer, the ordinary refractive index (noS1) of the substrate at the fundamental wavelength ($\lambda\mu m$), the ordinary refractive index (noF1) of the thin film waveguide layer at the fundamental wavelength ($\lambda\mu m$), the extraordinary refractive index (neS2) of the substrate at the second harmonic wavelength ($\lambda\mu m/2$), and the extraordinary refractive index (neF2) of the thin film waveguide layer at the second harmonic wavelength ($\lambda\mu m/2$), when $\dfrac{(n_{oF1} - n_{oS1})}{(n_{eF2} - n_{eS2})} > 2$ satisfy Equation (A') below, and it is particularly advantageous to satisfy Equation (A'') below.

$$0.1 \leq \dfrac{(\lambda + 0.1)N_1}{\lambda^3 T} \leq 3.0 \quad (A')$$

$$0.2 \leq \dfrac{(\lambda + 0.1)N_1}{\lambda^3 T} \leq 1.2 \quad (A'')$$

wherein, $N_1$ in Equation (A') and Equation (A'') above is $$N_1 = \dfrac{(n_{eF2} - n_{eS2})}{(n_{oF1} - n_{eS2})}$$

On the other hand, when $$\dfrac{(n_{oF1} - n_{oS1})}{(n_{eF2} - n_{eS2})} \leq 2$$

it is preferable to satisfy Equation (B') below, and it is particularly advantageous to satisfy Equation (B'') below.

$$0.2 \leq \dfrac{(\lambda + 0.1)N_2}{\lambda^3 T} \leq 3.0 \quad (B')$$

$$0.4 \leq \dfrac{(\lambda + 0.1)N_2}{\lambda^3 T} \leq 1.0 \quad (B'')$$

wherein, $N_2$ in Equation (B') and Equation (B'') above is $$N_2 = \dfrac{(n_{eF2} - n_{eS2})}{(n_{oF1} - n_{oS1})}$$

In the inventive SHG device, it is preferable that incident angle ($\theta$) of the fundamental wave to the optical axis (Z-axis) of the thin film waveguide layer is within the range $0\pm 15°$ or $90\pm 15°$.

This is because, when the incident angle ($\theta$) of the fundamental wave is within the above range, the conversion efficiency to the second harmonic is extremely high. It is particularly advantageous that the incident angle of the fundamental wave is within the range $0°\pm 5°$ or $90\pm 5°$.

Wavelength ($\lambda$) of the fundamental wave incident to the inventive SHG device is preferably 0.4 to 1.6 $\mu$m.

This is because, although a shorter wavelength is more advantageous as the fundamental wavelength ($\lambda$), generation by a semiconductor laser of laser wave shorter in wavelength than 0.4 $\mu$m is substantially difficult and, when a fundamental wave longer in wavelength than 1.6 $\mu$m is used, since the obtained second harmonic wavelength is ½ the fundamental wavelength, it is within a wavelength range that can be easily generated directly by a semiconductor laser, which has no advantages of use of the SHG device. It is advantageous that the wavelength ($\lambda$) of the fundamental wave is 0.6 to 1.3$\mu$m which is relative easy to obtain a semiconductor laser light source and, in particular, 0.68 to 0.94 $\mu$m is practically preferable.

The inventive SHG device preferably has a thickness (T) of the thin film waveguide layer of 0.1 to 20 $\mu$m.

This is because, when the thickness (T) of the thin film waveguide layer is smaller than 0.1 $\mu$m, it is difficult to apply the fundamental wave and, due to a low incident efficiency, it is difficult to obtain a substantially high SHG conversion efficiency. On the other hand, when the thickness (T) is greater than 20 $\mu$m, it has a low optical power density and hence a low SHG conversion efficiency. Either case is undesirable for a SHG device. It is particularly advantageous that the thin film waveguide layer has a thickness of 0.5 to 10 $\mu$m, and a thickness of 1 to 8 $\mu$m is particularly preferable.

A variety of optical materials can be used in the substrate and thin film waveguide layer used in the present invention; the thin film waveguide layer can be made of, for example, $LiNbO_3$, $Ba_2NaNb_5O_{15}$, $K_2LiNb_5O_{15}$, $Ba_2LiNb_5O_{15}$, $Sr_{1-x}Ba_xNb_2O_6$ (SBN), $\alpha$−quartz, KTi-OPO$_4$ (KTP), $\beta$-BaB$_2$O$_4$ (BBO), KB$_5$O$_5$·4H$_2$O (KB$_5$), KH$_2$PO$_4$ (KDP), KD$_2$PO$_4$ (KD*), NH$_4$H$_2$PO$_4$ (ADP), C$_5$H$_2$AsO$_4$ (CDA), C$_5$D$_2$AsO$_4$ (CD*A), RbH$_2$PO$_4$ (RDP), RbH$_2$AsO$_4$ (RDA), BeSO$_4$.4H$_2$O, LiClO$_4$.3-H$_2$O, LiIO$_3$, α-LiCdBO$_3$, LiB$_3$O$_5$ (LBO), urea, poly-p-nitroaniline (p-PNA), poly-diacetylene (DCH), 4-(N,N-dimethylamino)-3-acetamidonitrobenzene (DNA), 4-nitrobenzaldehyde-hydrazine (NBAH), 3-methoxy-4-nitrobenzaldehyde-hydrazine, 2-methyl-4-nitroaniline (MNA), or the like; and the substrate can be made of, for example, LiTaO$_3$, MgO, Gd$_3$Ga$_5$O$_{12}$ (GGG), Nd$_3$Ga$_5$O$_{12}$ (NdGG), Sm$_3$Ga$_5$O$_{12}$ (SmGG), SiO$_2$, alumina, KTP, BBO, LBO, KDP, or the like, soda glass, borosilicate glass, polymethylmethacrylate (PMMA), or the like.

These materials for the substrate and the thin film waveguide layer can be combined with a different element such as Na, Cr, Mg, Nd, Ti or the like to adjust their refractive indices.

Such a different element as Na, Cr, Mg, Nd, Ti or the like is added preferably using the procedure, in which the raw material and the impurity are previously mixed, and the thin film waveguide layer is formed on the substrate by such as a LPE (liquid phase epitaxial) technique, or, a diffusion technique is used to diffuse an impurity such as Na, Mg, Nd, Ti or the like into the the substrate or the thin film waveguide layer.

Material combinations of thin film waveguide layer/substrate suitable for use in the inventive SHG device include LiNbO$_3$/LiTaO$_3$, 2-methyl-4-nitroaniline (MHA)/alumina; KTiOPO$_4$ (KTP)/alumina, β-BaB$_2$O$_4$ (BBO)/alumina; 4(N,N-dimethylamino)-3-acetamidonitrobenzene (DAN)/SiO$_2$; 4-(N,N-methylamino)-3-acetamidonitrobenzene (DAN)/polymethylmethacrylate (PMMA); LiB$_3$O$_5$ (LBO)/BBO; LBO/alumina; RbH$_2$PO$_4$ (RDP)/KH$_2$PO$_4$ (KDP); and poly-p-nitroaniline (p-PNA)/PMMA.

Above all, a combination of LiTaO$_3$ for the substrate with LiNbO$_3$ for the thin film waveguide layer is particularly preferable for use in the SHG device.

This is because the LiNBo$_3$ is large in nonlinear optical constant and small in optical loss, and can be formed into a uniform thin film, and LiTaO$_3$ is similar in crystal structure to the LiNbO$_3$, easy to form a thin film of LiNbO$_3$ on it, and easy to obtain a high-quality, inexpensive crystal.

The inventive SHG device is preferably of a channel type waveguide with a width of 1 to 10 μm. The reason why a SHG device using a channel-type waveguide is advantageous is that this type of device can have a high optical power density over a slab type. The reason why a width of 1 to 10 μm is advantageous is that a width smaller than 1 μm is difficult to introduce incident light into the waveguide and low in incident efficiency, resulting in a low SHG conversion efficiency, and, although a larger width has a higher incident efficiency, a width greater than 10 μm is low in optical power density, resulting in a low SHG conversion efficiency.

The inventive SHG device can be produced by forming the thin film waveguide layer on the substrate by sputtering or a liquid phase epitaxial method. Furthermore, on top of the thin film waveguide layer, a Ti waveguide pattern can be formed by photolithography and RF sputtering, which can be used as an etching mask in ion beam etching to form a channel-type SHG device.

DESCRIPTION OF PREFERRED EMBODIMENTS

Examples of the present invention will now be described in detail.

EXAMPLE 1-1

For a fundamental wavelength (λ) of 0.83 μm, a LiNbO$_3$ single crystal thin film comprising a solid solution with 1 mole % each of Nd and Na having an ordinary refractive index (noF1) of 2.270 at the fundamental wavelength and an extraordinary refractive index (neF2) of 2.263 at the second harmonic wavelenght was grown by a liquid phase epitaxial method to a thickness of 1.80 μm on a 0.5 mm thick X-cut LiTaO$_3$ single crystal substrate having an ordinary refractive index (noS$_1$) of 2.151 at the fundamental wavelength and an extraordinary refractive index (neS2) of 2.261 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_1/(\lambda^3 T)\} = 0.2$.

To the SHG device, a 50 mW semiconductor laser of 0.83 μm in wavelength was applied with an incident angle of 90° with respect to the optical axis (Z-axis) of the Nd/Na-containing LiNbO$_3$ single crystal thin film. As a result, the SHG device exhibited a SHG conversion efficiency of 18.8%, showing that it is a SHG device with an extremely high SHG conversion efficiency.

EXAMPLE 1-2

Using the same procedure as in above Example 1-2, a SHG device was fabricated using a LiNbO$_3$ single crystal thin film having a thickness of 7.23 μm. This SHG device corresponds to the case of $\{(\lambda+0.1)N_1/(\lambda^3 T)\} = 0.05$.

This SHG device was measured for the SHG conversion efficiency as in Example 1-1 and found to have a SHG conversion efficiency of 1.4%, showing that it is a SHG device with a sufficiently high SHG conversion efficiency.

EXAMPLE 1-3

Using the same procedure as in above Example 1-1, a SHG device was fabricated using a LiNbO$_3$ single crystal thin film having a thickness of 0.24 μm. This SHG device corresponds to the case of $\{(\lambda+0.1)N_1/(\lambda^3 T)\} = 1.5$.

This SHG device was measured for the SHG conversion efficiency as in Example 1-1 and found to have a SHG conversion efficiency of 2.5%, showing that it is a SHG device with a sufficiently high SHG conversion efficiency.

EXAMPLE 1-4

An etching mask of 5.0 μm in width was formed using a photoresist film on the single crystal thin film of the SHG device obtained in Example 1-1, which was then ion beam-etched to fabricate a channel-type SHG device.

This SHG device was measured for the SHG conversion efficiency as in Example 1-1and found to have a SHG conversion efficiency of 33.0%, showing that it is a SHG device with an extremely high SHG conversion efficiency.

EXAMPLE 2-1

For a fundamental wavelength (λ) of 0.83 μm, a LiNbO$_3$ single crystal thin film having an ordinary refractive index (noF1) of 2.253 at the fundamental wavelength and an extraordinary refractive index (neF2) of 2.249 at the second harmonic wavelength was grown by a RF sputtering method to a thickness of 3.15 μm on an Al$_2$O$_3$ single crystal substrate having an ordinary refractive index (noS1) of 1.759 at the fundamental wavelength and an extraodinary refractive index (neS2) of 1.779 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_2/(\lambda^3T)\}=0.5$.

To the SHG device, a 40 mW semiconductor laser of 0.83 μm in wavelength was applied with an incident angle of 90° with respect to the optical axis (Z-axis) of the LiNbO$_3$ single crystal thin film. As a result, the SHG device exhibited a SHG conversion efficiency of 12.2%, showing that it is a SHG device with an extremely high SHG conversion efficiency.

EXAMPLE 2-2

Using the same procedure as in above Example 2-1, a SHG device was fabricated using a LiNbO$_3$ single crystal thin film having a thickness of 0.45 μm. This SHG device corresponds to the case of $\{(\lambda'0.1)N_2/(\lambda^3T)\}=3.5$.

This SHG device was measured for the SHG conversion efficiency as in Example 2-1 and found to have a SHG conversion efficiency of 1.7%, showing that it is a SHG device with a sufficiently high SHG conversion efficiency.

EXAMPLE 2-3

Using the same procedure as in above Example 2-1, a SHG device was fabricated using a LiNbO$_3$ single crystal thin film having a thickness of 8.74 μm. This SHG device corresponds to the case of $\{(\lambda+0.1)N_2/(\lambda^3T)\}=0.18$.

This SHG device was measured for the SHG conversion efficiency as in Example 2-1 and found to have a SHG conversion efficiency of 1.2%, showing that it is a SHG device with a sufficiently high SHG conversion efficiency.

EXAMPLE 3-1

For a fundamental wavelength (λ) of 0.90 μm, a SBN25 (Sr$_{0.25}$Ba$_{0.75}$Nb$_2$O$_6$) thin film having an ordinary refractive index (noF1) of 2.250 at the fundamental wavelength and an extraordinary refractive index (neF2) of 2.225 at the second harmonic wavelength was grown by a RF sputtering method to a thickness of 2.29 μm on a NdGG (Nd$_3$Ga$_5$O$_{12}$) single crystal substrate having an ordinary refractive index (noS1) of 1.965 at the fundamental wavelength and an extraordinary refractive index (neS2) of 1.979 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_2/(\lambda^3T)\}=0.52$.

To the SHG device, a 50 mW semiconductor laser of 0.90 μm in wavelength was applied with an incident angle of 0° with respect to the optical axis (Z-axis) of the SBN thin film. As a result, the SHG device exhibited a SHG conversion efficiency of 17.8%, showing that it is a SHG device with an extremely high SHG conversion efficiency.

EXAMPLE 3-2

Using the same procedure as in above Example 3-1, a SHG device was fabricated using a SBN25 thin film having a thickness of 0.30 μm. This SHG device corresponds to the case of $\{(\lambda+0.1)N_2/(\lambda^3T)\}=4.0$.

This SHG device was measured for the SHG conversion efficiency as in Example 3-1 and found to have a SHG conversion efficiency of 1.1%, showing that it is a SHG device with a sufficiently high SHG conversion efficiency.

EXAMPLE 3-3

Using the same procedure as in above Example 3-1, a SHG device was fabricated using a SBN25 thin film having a thickness of 3.95 μm. This SHG device corresponds to the case of $\{(\lambda+0.1)N_2/(\lambda^3T)\}=0.3$.

This SHG device was measured for the SHG conversion efficiency as in Example 3-1 and found to have a SHG conversion efficiency of 4.5%, showing that it is a SHG device with a sufficiently high SHG conversion efficiency.

EXAMPLE 4-1

For a fundamental wavelength (λ) of 0.67 μm, a KNbO$_3$ single crystal thin film having an ordinary refractive index (noF1) of 2.320 at the fundamental wavelength and an extraordinary refractive index (neF2) of 2.319 at the second harmonic wavelength was grown by a liquid phase epitaxial method to a thickness of 4.10 μm on a KTP (KTiOPO$_4$) single crystal substrate having an ordinary refractive index (noS1) of 1.860 at the fundamental wavelength and an extraordinary refractive index (neS2) of 1.822 at the second harmonic wavelength, and an optical device was fabricated using the thin film as a slab-type waveguide. Both end faces of the device wre mirror-finished to allow transmission of light through the end faces, thus forming a SHG device. This SHG device corresponds to the case of $\{(\lambda+0.1)N_2/(\lambda^3T)\}=0.67$.

To the SHG device, a 5 mW semiconductor laser of 0.67 μm in wavelength was applied with an incident angle of 90°. As a result, the SHG device exhibited a SHG conversion efficiency of 13.8%, showing that it is a SHG device with an extremely high SHG conversion efficiency.

EXAMPLE 4-2

Using the same procedure as in above Example 4-1, a SHG device was fabricated using a KTP thin film having a thickness of 0.69 μm. This SHG device corresponds to the case of $\{(\lambda+0.1)N_2/(\lambda^3T)\}=4.0$.

This SHG device was measured for the SHG conversion efficiency as in Example 3-1 and found to have a SHG device with a sufficiently high SHG conversion efficiency.

EXAMPLE 4-3

Using the same procedure as in above Example 4-1, a SHG device was fabricated using a KTP thin film having a thickness of 9.18 μm. This SHG device corresponds to the case of $\{(\lambda+0.1)N_2/(\lambda^3T)\}=0.3$.

This SHG device was measured for the SHG conversion efficiency as in Example 3-1 and found to have a SHG conversion efficiency of 1.2%, showing that it is a SHG device with a sufficiently high SHG conversion efficiency.

EXAMPLE 5-1

For a fundamental wavelength ($\lambda$) of 0.488 $\mu$m, a BBO ($\beta$-BaBO$_4$) thin film having an ordinary refractive index (noF1) of 2.262 at the fundamental wavelength and an extraordinary refractive index (neF2) of 2.256 at the second harmonic wavelength was grown by a RF sputtering method to a thickness of 5.24 $\mu$m on a LBO (LiB$_3$O$_5$) substrate having an ordinary refractive index (noS1) of 1.965 at the fundamental wavelength and an extraordinary refractive index (neS2) of 1.979 at the second harmonic wavelength, and an optical device was fabricated using the thin film as a slab-type waveguide. Both end faces of the device were mirror-finished to allow transmission of light through the end faces, thus forming a SHG device. This SHG device corresponds to the case of $\{(\lambda+0.1)N_2/(\lambda^3T)\}=0.90$.

To the SHG device, a 100 mW Ar laser of 0.488 $\mu$m in wavelength was applied with an incident angle of 0° with respect to the optical axis (Z-axis) of the BBO thin film. As a result, the SHG device exhibited a SHG conversion efficiency of 33.4%, showing that it is a SHG device with an extremely high SHG conversion efficiency.

EXAMPLE 5-2

Using the same procedure as in above Example 5-1, a SHG device was fabricated using a BBO thin film having a thickness of 1.18 $\mu$m. This SHG device corresponds to the case of $\{(\lambda+0.1)N_2/(\lambda^3T)\}=4.0$.

This SHG device was measured for the SHG conversion efficiency as in Example 5-1 and found to have a SHG conversion efficiency of 2.8%, showing that it is a SHG device with a sufficiently high SHG conversion efficiency.

EXAMPLE 5-3

Using the same procedure as in above Example 5-1, a SHG device was fabricated using a BBO thin film having a thickness of 15.73 $\mu$m. This SHG device corresponds to the case of $\{(\lambda+0.1)N_2/(\lambda^3T)\}=0.3$.

This SHG device was measured for the SHG conversion efficiency as in Example 5-1 and found to have a SHG conversion efficiency of 2.2%, showing that it is a SHG device with a sufficiently high SHG conversion efficiency.

As described above, the present invention can provide a SHG device of a thin film waveguide structure having an extremely high SHG conversion efficiency.

We claim:

1. A second harmonic wave generating device comprising a thin film waveguide layer formed on a substrate, characterized in that a fundamental wavelength ($\lambda\mu$m), a thickness (T$\mu$m) of said thin film waveguide layer, an ordinary refractive index (noS1) of said substrate at said fundamental wavelength ($\lambda\mu$m), an ordinary refractive index (noF1) of said thin film waveguide layer at said fundamental wavelength ($\lambda\mu$m), an extraordinary refractive index (neS2) of said substrate at a second harmonic wavelength ($\lambda\mu$m/2), and an extraordinary refractive index (neF2) of said thin film waveguide layer at said second harmonic wavelength ($\lambda\mu$m/2) are represented by an equation, when $\dfrac{(n_{oF1} - n_{oS1})}{(n_{eF2} - n_{eS2})} > 2$ $$0.02 \leq \dfrac{(\lambda + 0.1) N_1}{\lambda^3 T} \leq 6.0 \quad (A)$$

or, when $\dfrac{(n_{oF1} - n_{oS1})}{(n_{eF2} - n_{eS2})} \leq 2$ $$0.05 \leq \dfrac{(\lambda + 0.1) N_2}{\lambda^3 T} \leq 5.0 \quad (B)$$

wherein, $N_1$ in Equation (A) is $$N_1 = \dfrac{(n_{eF2} - n_{eS2})}{(n_{oF1} - n_{eS2})}$$

and $N_2$ in Equation (B) is $$N_2 = \dfrac{(n_{eF2} - n_{eS2})}{(n_{oF1} - n_{oS1})}.$$

2. The second harmonic wave generating device as claimed in claim 1 wherein incident angle ($\theta$) of the fundamental wave to the optical axis (Z-axis) of said thin film waveguide layer is 0±15° or 90±15°.

3. The second harmonic wave generating device as claimed in claim 1 wherein said fundamental wavelength ($\lambda\mu$m) is 0.4 to 1.6 $\mu$m.

4. The second harmonic wave generating device as claimed in claim 1 wherein said thin film waveguide layer has a thickness (T) of 0.1 to 20 $\mu$m.

5. The second harmonic wave generating device as claimed in claim 1 wherein said film waveguide layer is made of a material selected from the group consisting of LiNbO$_3$, Ba$_2$Na Nd$_5$O$_{15}$, K$_2$LiNd$_5$O$_{15}$, Ba$_2$LiNb$_5$O$_{15}$, Sr$_{1-x}$Ba$_x$Nb$_2$O$_6$ (SBN), $\alpha$-quartz, KTiOPO$_4$(KTP), $\beta$-BaB$_2$O$_4$ (BBO), KB$_5$O$_8$.4H$_2$O (KB$_5$), KH$_2$PO$_4$ (KDP), KD$_2$PO$_4$ (KD*), NH$_4$H$_2$PO$_4$ (ADP), C$_5$H$_2$AsO$_4$ (CDA), C$_5$D$_2$AsO$_4$ (CD*A), RbH$_2$PO$_4$ (RDP), RbH$_2$AsO$_4$ (RDA), BeSO$_4$.4H$_2$O, LiClO$_4$,3-H$_2$O, LiIO$_3$, $\alpha$-LiCdBO$_3$, LiB$_3$O$_5$ (LBO), urea, poly-p-nitroaniline (p-PNA), poly-diacetylene (DCH), 4-(N,N-dimethylamino)-3-acetamidonitrobenzene (DAN), 4-nitrobenzaldehyde-hydrazine (NBAH), 3-methoxy-4-nitrobenzaldehyde-hydrazine, and 2-methyl-4-nitroaniline (MNA).

6. The second harmonic wave generating device as claimed in claim 1 wherein said substrate is made of a material selected from the group consisting of LiTaO$_3$, MgO, Gd$_3$Ga$_5$O$_{15}$ (GGG), Nd$_3$Ga$_5$O$_{12}$ (NdGG), Sm$_3$Ga$_5$O$_{15}$ (SmGG), SiO$_2$, alumina, KTP, BBO, LBO, KDP, and the like, soda glass, borosilicate glass, and polymethylmethacrylate (PMMA).

7. The second harmonic wave generating device as claimed in claim 1 of a channel type having a width of 1 to 10 $\mu$m.

* * * * *